June 12, 1923.
R. SPANGENBERG
WHEEL GAUGE
Filed Aug. 18, 1919
1,458,598
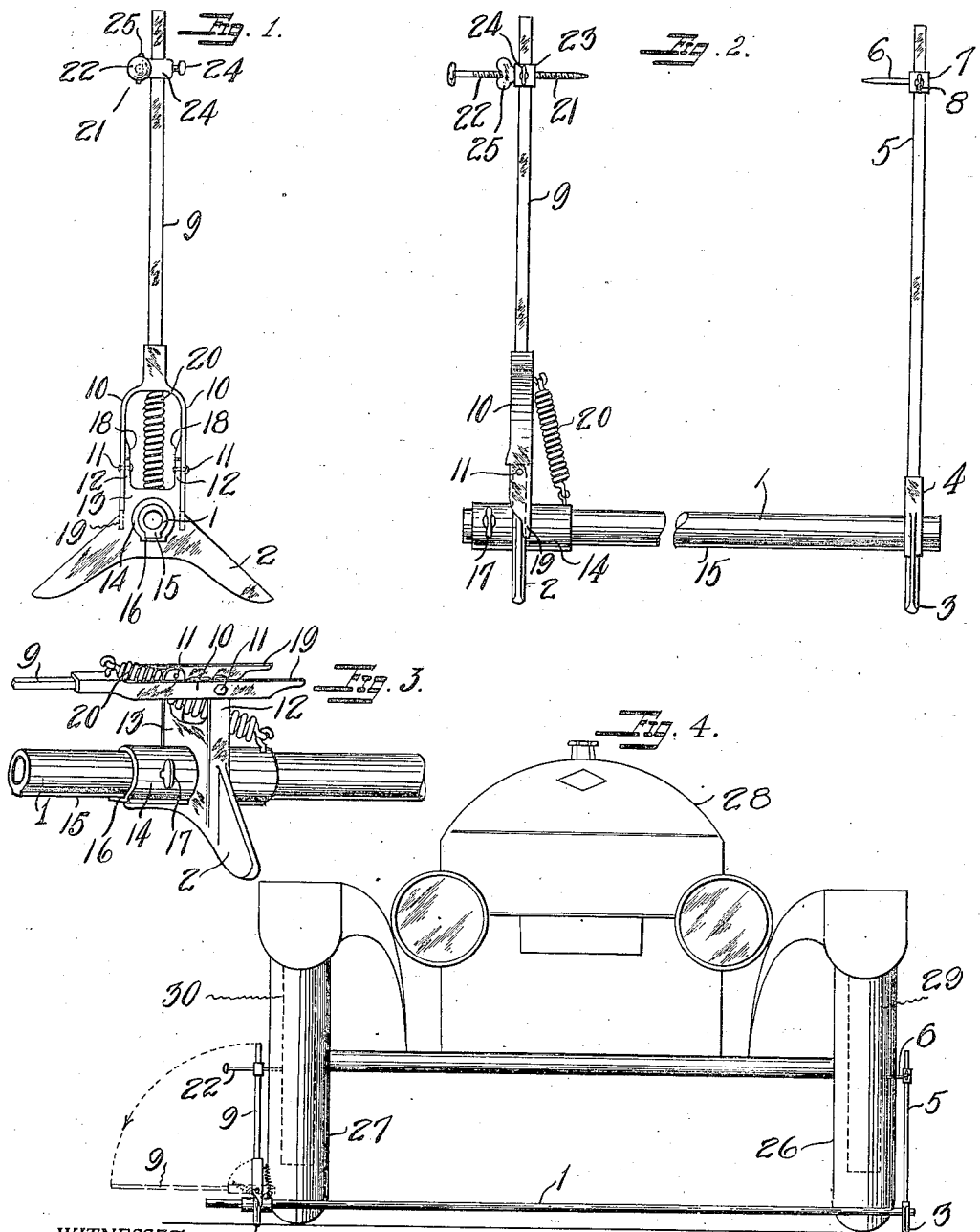
WITNESSES:
J. B. Gardner
N. Chapman
INVENTOR
R. SPANGENBERG.
BY White & Prost.
HIS ATTORNEYS Patented June 12, 1923.

1,458,598

UNITED STATES PATENT OFFICE.

RUDOLPH SPANGENBERG, OF OAKLAND, CALIFORNIA, ASSIGNOR TO JESSIE L. CALL, OF OAKLAND, CALIFORNIA.

WHEEL GAUGE.

Application filed August 18, 1919. Serial No. 318,110.

*To all whom it may concern:*

Be it known that I, RUDOLPH SPANGENBERG, a citizen of the United States, and a resident of Oakland, county of Alameda, and State of California, have invented a new and useful Wheel Gauge, of which the following is a specification.

My invention relates to an improved gauge for correcting the alinement of vehicle wheels.

Vehicle wheels, particularly the front wheels of automobiles frequently get out of alinement with respect to one another due to minor collisions or constant jarring and bumping as well as from being severely dumped into an object, and in any event when out of alinement cause the tires to be unduly worn and are likely to interfere with the proper steering of the automobile. Much difficulty is experienced ordinarily in setting or gauging the wheels so that they are accurately alined, and it is an object of the present invention to provide a gauge by means of which the wheels may be quickly, easily and accurately brought to alinement.

Another object of the invention is to provide a wheel gauge of the character described in which adjustable gauge elements forming a part of the invention when once adjusted as desired may be moved into and out of gauging position to provide for changing position of the gauge between different points of the wheels, without necessitating readjustment of said gauge elements, thus saving time and insuring accuracy of gauging.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of the device of my invention, but it is to be understood that I do not limit myself to such form, since the invention, as expressed in the claims may be embodied in a plurality of other forms.

Referring to said drawings:

Figure 1 is an elevation of my wheel gauge.

Figure 2 is a side elevation of the gauge, the rod being broken.

Figure 3 is a fragmentary perspective view of the pivot construction of the pivoted gauge arm showing the arm held in down position by the action of the spring.

Figure 4 is a front elevation of an automobile showing my gauge as it would appear when in use.

In carrying out my invention I employ a base member on which is mounted a fixed gauge arm and an adjustable gauge arm, the latter being pivoted to the base. The gauge members are vertically adjustably mounted on the arms, the one of said members on the pivoted arm being adjustable towards and away from the member on the other or fixed arm.

The gauge arms are so arranged that when set up and adjusted to measure or gauge between certain opposite points of two wheels, the pivoted arm may be swung out of gauging position, the gauge moved into position to measure or gauge between two other opposite points of the wheels, and the pivoted arm will return to the gauging position first assumed, thus maintaining the original adjustment. In this way the gauge may be very quickly and accurately applied in correcting the wheel alinement.

As it is usually necessary in alining wheels to apply the gauge several times to different opposite points in order to secure accuracy of alinement much time is consumed and no little difficulty is experienced but with my gauge fewer applications of the gauge are needed and because of this and the fact that little or no adjusting is necessary, much time and labor will be saved.

In construction, my invention embodies a base which comprises a bar 1 supported horizontally by legs or feet 2 and 3 located at the ends thereof. This bar is preferably cylindrical and of a length greater than the width of an ordinary automobile.

Carried by a casting 4 on which the feet 3 are formed and which is fixed to the bar 1 is an upright gauge arm 5 upon which arm is vertically adjustably mounted a gauge member 6. This member 6 extends inwardly from the arm at right angles thereto and is fixed to a sleeve 7 that is slidably mounted on the arm 5. A set screw 8 is carried by the sleeve 7 and is adapted to engage the arm 5 to hold the member 6 in adjusted position.

An upright gauge arm 9 similar to the arm 5 is slidably mounted on the bar 1.

This arm terminates at its lower end in two opposed arms 10 which are pivoted as at 11 to opposed ears 12 that are formed on a casting 13. This casting has the feet 2 formed thereon and is fixed to a sleeve 14 which is splined on the bar 1. The bar is provided on its under face with a key 15 which works in a key way 16 formed in the sleeve 14. A set screw 17 is carried by the sleeve 14 and is adapted to engage the bar 1 to hold the sleeve and arm in adjusted position.

Lugs 18 are formed on the inner face of the arms 10 and are adapted to engage the upper ends of the ears 12 so as to limit the movement of the arm in one direction. In addition to these lugs there are provided stop members 19 on the lower extremities of the arms 10 for engaging the feet 2 and limiting the movement of the arm 9 in one direction. These stop members are formed by reducing and extending the arms 10 so that they overlie one side of the feet 2 when the arm 9 is in upright position.

Secured at one end to the sleeve 14 and at its other end to the arm 9 is a retractile spring 20, which is arranged to hold the arm in down position as well as in upright position. This spring tends to pull the arm into down position when the arm is swung past a 45° angle in moving it into down position, and likewise in moving the arm back to upright position when brought past the 45° point the spring will act to urge the arm upwardly.

A gauge member 21 is vertically adjustably mounted on the arm 9. This member comprises a screw 22 working in a threaded opening formed through a sleeve 23 which latter is slidably mounted on the arm 9. A set screw 24 is carried by the sleeve and is adapted to engage the arm 9 to hold the member 21 in adjusted position. The screw 22 is extended towards the member 6 and is adjustable towards and away from said member. A winged lock nut 25 is mounted on the screw and adapted to be brought in binding-engagement with the sleeve 23 so as to lock the pin 22 in adjusted position.

In the operation of my gauge, it may be applied to an automobile as shown in Figure 1 of the drawing so that the bar 1 extends in front of and across the wheels 26 and 27 of the automobile 28. The arm 5 is brought into such position that the gauge member 6 thereon will touch the felly 29 of the wheel 26 on the front side of the said wheel. The sleeve 14 with the casting 13 and feet 2 are moved so as to bring the arm 9 close to the wheel 27 and the set screw 17 is turned so as to engage the bar 1 and hold the sleeve and arm in the adjusted position. The screw 22 of the gauge member 21 is turned to bring the point thereof in engagement with the felly 30 of the wheel 27 at the front side of said wheel. When the gauge is thus set up the gauge members 6 and 21 should be substantially opposite and in the same plane, and when so adjusted should be set by turning the set screws 8 and 17. The lock nut 25 should be set also to lock the screw in adjusted position.

Having set up the gauge as outlined hereinbefore, the arm 9 is swung downwardly on its pivots 11 out of gauging position, and when the arm is moved past the 45° point it is urged and held down by the spring 20 and thus held while the gauge is moved to lie in the rear of the wheels 26 and 27. The arm 5 is brought to engage the felly 29 of the wheel 26 at the rear side of the wheel and by forcing the arm upwardly past the 45° point the arm will return it to gauging position. By setting the sleeves 14 and 23 against unintentional movement and likewise locking the screw 22 the arm may be swung into and out of position without necessitating changing the adjustment of the sleeve 14 or screw 22. The stop members 19 prevent the arm from being moved past a vertical position and insure the return of the arm to the same position.

When the arm is brought back to gauging position, if the screw 22 is spaced from the felly 29 at the rear of the wheel 26, adjustment of the wheel is needed to bring the wheel in alinement with the other wheel. The arm 9 may be swung out of the way and the gauge moved out of place so as to effect adjustment of the wheel. After adjusting the wheels, the gauge may then be brought back into position and set up as before with relation to the wheels, the operation of applying the gauge to the front and rear edges of the wheels being carried out as often as is necessary to effect the alinement of the wheels. The range of adjustment permitted the members 6 and 21 enables the gauging of the wheels between various points thereof to insure accuracy of alinement.

It may be noted that if it is desirable, the wheels may be gauged by placing the device between instead of around the two wheels. To use the device in this manner it is only necessary to reverse the positions of the sleeves 14 and 7 so that the screw 22 and member 6 will point away from each other.

I claim:

1. In a device of the character described, a bar, a gauge arm extending upwardly from and mounted on the bar, a member mounted on the bar for adjustment towards and away from the gauge arm, an upright gauge arm pivoted to said member, and a spring tending to return the last named gauge arm to upright position.

2. In a device of the character described, a bar, a gauge arm extending upwardly from and mounted on the bar, a member mounted on the bar for adjustment towards and away from the gauge arm, an upright gauge arm pivoted to said member, a spring tending to return the last named gauge arm to upright position, and stop members to limit the movement of the arm pivoted in one direction.

3. In a device of the character described, a bar, a gauge arm mounted in upright position on the bar, a second gauge arm mounted in upright position on the bar so as to be adjustable towards and away from the first named arm, means to secure the second named arm in adjusted position on the bar, and means permitting the last named bar to be swung downwardly out of upright position without requiring adjustment of the arm on said bar.

4. In a device of the character described, a bar, a gauge arm mounted in upright position on the bar, a second gauge arm mounted in upright position on the bar so as to be adjustable towards and away from the first named arm, means to secure the second named arm in adjusted position on the bar, means permitting the last named bar to be swung downwardly out of upright position without requiring adjustment of the arm on said bar and a spring arranged to return the last named arm to upright position and to hold the arm in both positions.

5. In a device of the character described a bar, a gauge arm extending upwardly from and mounted on the bar, a member mounted to slide on said bar towards and away from the gauge arm, an upright gauge arm pivoted to the member and a spring arranged to hold the arm in both upright and down positions.

6. In a device of the character described, a vertically disposed gauge arm, a pivotally mounted gauge member adapted to swing toward and from said arm, resilient means tending to retain said member either in or out of gauging position, and means adjustably connecting said arm and member.

In testimony whereof, I have hereunto set my hand at Oakland, California, this 8th day of August 1919.

RUDOLPH SPANGENBERG.

In presence of—
L. L. M. SALSBURY,
J. B. GARDNER.